United States Patent [19]

Easter

[11] 4,342,998

[45] Aug. 3, 1982

[54] PULSED RADIO FREQUENCY TRANSMITTING AND RECEIVING SYSTEM

[75] Inventor: Finis C. Easter, Canoga Park, Calif.

[73] Assignee: Sperry Corporation, New York, N.Y.

[21] Appl. No.: 212,861

[22] Filed: Dec. 4, 1980

[51] Int. Cl.³ .................................................. G01S 7/28
[52] U.S. Cl. .............................. 343/17.1 R; 343/5 W
[58] Field of Search .................................. 343/17.1 R

[56] References Cited

U.S. PATENT DOCUMENTS 4,238,796 12/1980 Mawhinney .................. 343/17.1 R
4,241,345 12/1980 Johnson ........................... 343/5 SW Primary Examiner—T. H. Tubbesing Attorney, Agent, or Firm—Howard P. Terry

[57] ABSTRACT

A radio frequency transmitter-receiver alternately transmits signal pulses of frequency $F_1$ and receives return echo signals of frequency $F_1$. The transmitter signal of frequency $F_1$ is generated by mixing signals of frequencies $F_2$ and $F_3$. A signal of frequency $F_3$ is generated by mixing signals of frequencies $F_4$ and $F_5$. The return signal of frequency $F_1$ is mixed with frequency $F_2$ which is continuously generated by the transmitter to produce a signal of intermediate frequency $F_3$. Frequency $F_5$ and therefore frequencies $F_3$ and $F_1$ are only generated during signal transmission and therefore do not interfere with the return signal of frequency $F_1$ and the produced intermediate frequency $F_3$.

6 Claims, 1 Drawing Figure

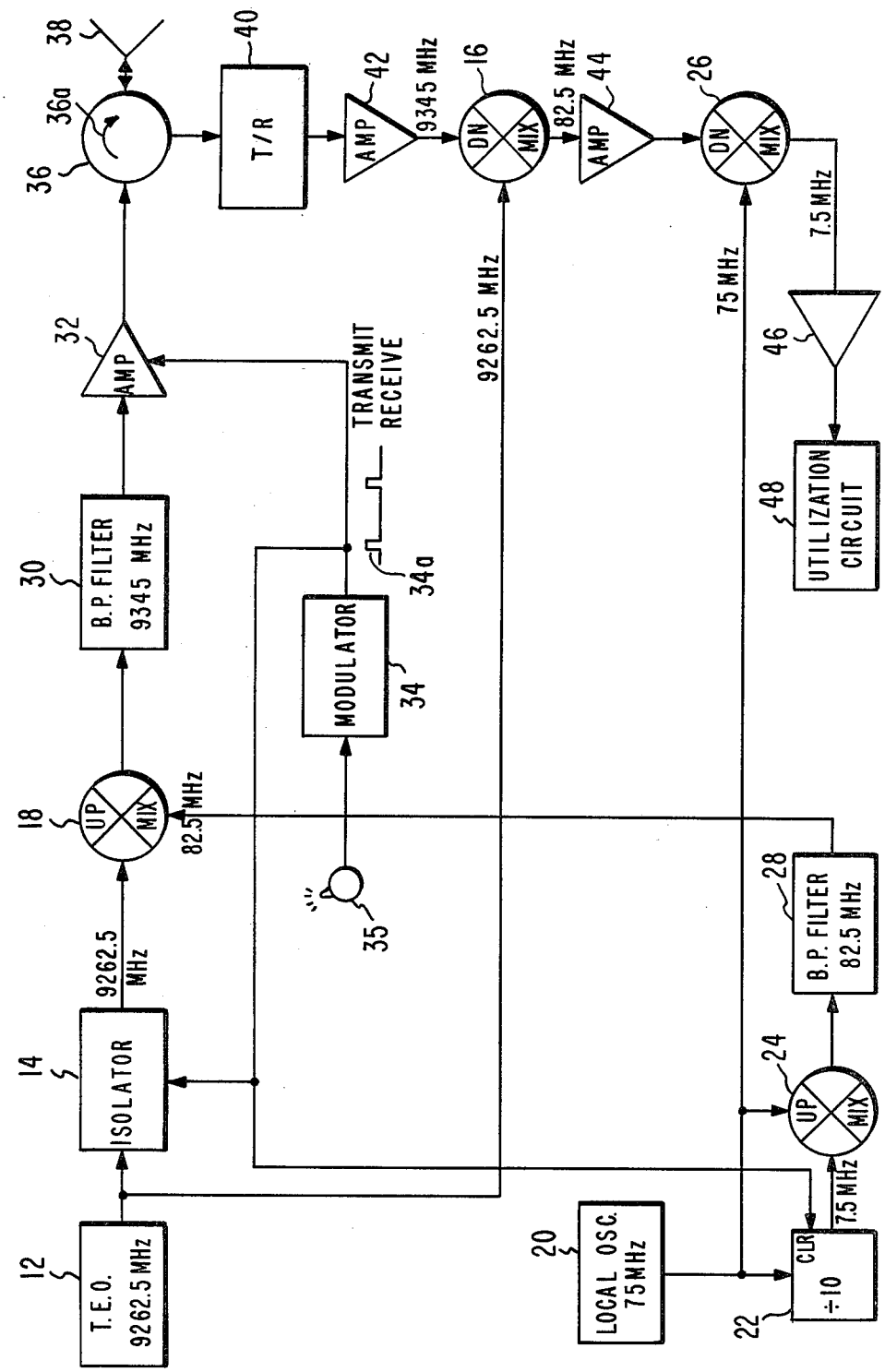

PULSED RADIO FREQUENCY TRANSMITTING AND RECEIVING SYSTEM

The present invention is concerned with a pulsed radio frequency transmitting oscillator and, more particularly, with such an oscillator which generates the transmitting frequency and intermediate frequencies (IF) only while transmitting, and otherwise generates different frequencies.

In the prior art, a pulsed radar transmitting and receiving system has utilized a magnetron as the radio frequency (RF) pulse producing element. The magnetron responds to a modulating high voltage bias pulse by generating a high powered transmitting signal at some preselected frequency, and ideally either generates that frequency without change in frequency as the magnetron is turned on and off or, when no bias pulse is present, generates no frequency. Magnetrons come close to the ideal. They are, however, bulky and heavy when compared to modern solid-state technology. It is, therefore, desirable to utilize a solid-state transmitting oscillator circuit. Such a circuit should, like the magnetron, generate only the desired frequency when pulsed and generate no frequency, or at least not the preselected frequency, when turned "off". Further, the system should not have an IF component except as caused by the return signal.

Such solid-state-type oscillators undesirably exhibit wide frequency excursions upon turn on. If the oscillator remains on continuously or if an intermediate frequency producing component is present, these signals tend to mask very weak radar return signals, thus reducing substantially the sensitivity of the system. U.S. patent application Ser. No. 044,177, now U.S. Pat. No. 4,241,345, filed May 31, 1979, by H. C. Johnson discloses a pulsed radar transmitting oscillator having an oscillator which is switched between the desired transmitting frequency, when transmission is occurring, and some other frequencies slightly removed from the transmitting frequency when transmission is not occurring.

In accordance with a preferred embodiment of the instant invention, a radio frequency transmitter-receiver for periodically alternately transmitting a signal pulse of radio frequency $F_1$ and for otherwise receiving a return echo signal of frequency $F_1$ comprises a first means for generating a signal of frequency $F_2$, a second means generating a signal of frequency $F_3 = F_1 \pm F_2$, only when the signal of frequency $F_1$ is being transmitted, means responsive to signals of frequencies $F_2$ and $F_3$ for generating a signal of frequency $F_1$. A fourth means is responsive to the return echo signal of frequency $F_1$ and first means signal for producing a signal of intermediate frequency $F_3$ at a time that signals of frequencies $F_1$ and $F_3$ are not generated in the transmitter-receiver.

In the drawing:

The sole FIGURE is a preferred embodiment of the transmitting and receiving portion of a pulsed radar system in block diagram form including the transmitting oscillator circuitry in accordance with the invention.

Referring now to the sole FIGURE, a transferred electron oscillator (TEO) 12 (such as a gunn-type device) continuously generates a signal of frequency $F_2$ such as 9262.5 MHz (all frequencies are by way of example only). TEO 12 is connected to an isolator 14 and to a subtractive mixer 16. Typical mixers produce both the frequency sum and difference of signals applied thereto. If the sum signal is beyond the capabilities of the mixer, only the difference signal is produced. The terms "UP MIX" and "DN MIX" in various mixers in the sole FIGURE indicate which output signal is being used by subsequent circuitry. solator 14, which typically produces about 80 dB isolation, is coupled to a mixer 18. A continuously operating local oscillator 20 generates a signal of frequency $F_4$ such as 75 MHz. Local oscillator 20 need not be controlled to high accuracy, such as by providing a crystal oscillator, for reasons to be discussed hereinafter. Local oscillator 20 is connected to a division circuit such as a divide-by-10 circuit 22, and to mixers 24 and 26. Mixer 24 is preferably a balanced mixer which produces an output signal only when it receives both input signals. Divide-by10 circuit 22, which generates a signal of frequency $F_5$ such as 7.5 MHz, is connected to mixer 24 which therefore produces a signal of frequency $F_3$ such as 82.5 MHz, and a signal of 67.5 MHz. Mixer 24 is connected to a bandpass filter 28 which passes the additive frequency only (82.5 MHz), when present, to mixer 18. Mixer 18 produces a signal of frequency $F_1$ such as 9345 MHz and produces a signal of 9180 MHz. Mixer 18 is connected to a bandpass filter 30 which passes the additive frequency only (9345 MHz) to a suitable power amplifier 32 to which filter 30 is connected. Amplifier 32 may typically produce an output signal of 100 watts.

A suitable modulator 34 is connected to a control terminal of each of isolator 14 and amplifier 32, and to the clear (CLR) terminal of circuit 22. Modulator 34 may be of the type described in U.S. patent application, Ser. No. 044,217, now U.S. Pat. No. 4,283,790, filed May 31, 1979, by the instant inventor and D. P. Clock and assigned to the assignee of the instant invention. Modulator 34 may typically produce a 10 microsecond relatively positive transmit pulse every 5 milliseconds as illustrated at 34a. The actual length of the pulse may typically be 5 to 35 microseconds as determined by the setting of switch 35 which is attached to the modulator. The pulse enables isolator 14 to pass the signal from TEO 12 to mixer 18, enables amplifier 32 to pass the 9345 MHz signal to circulator 36, and removes the clear pulse from divide-by-10 circuit 22. When the clear pulse is removed from divide-by-10 circuit 22 it produces a 7.5 MHz signal which is applied to mixer 24.

Circulator 36 is a conventional three-port circulator connected to a transmitting and receiving antenna 38 of suitable design and to a transmit/receive switch (T/R) 40. As is known to those skilled in the art, circulator 36 normally passes signals in the direction of arrow 36a, such that a signal from amplifier 32 is passed to antenna 38 and a return echo signal from a target (not shown) appearing at antenna 38 is passed to T/R 40 and thence to amplifier 42. In fact, however, a reverse leakage path exists in circulator 36 such that a signal from amplifier 32 is also passed by circulator 36 to T/R 40. The purpose of T/R 40 is to prevent the signal from amplifier 32, when present, from damaging amplifier 42.

T/R 40 is connected to a suitable amplifier 42 which may typically provide 15 dB gain. Amplifier 42 is connected to mixer 16 which is also receptive of a 9262.5 MHz signal from TEO 12 and which therefore produces the difference frequency 82.5 MHz, which is the first IF frequency. Alternatively, T/R 40 may be connected directly to mixer 16 eliminating the need for amplifier 42 if a receiving system with a relatively higher noise figure is acceptable. Mixer 16 is connected to an amplifier 44 which is connected to mixer 26. Mixer 26 which is also receptive of a signal of 75 MHz from local oscillator 20 produces the difference frequency 7.5 MHz which is the second IF frequency. Mixer 26 is connected to a further amplifier 46 and thence to a suitable utilization circuit 48. The additive frequency 157.5 MHz also produced by mixer 26 is not passed by relatively low pass amplifier 46.

Operation of the system is as follows. TEO 12 continuously produces a signal of 9262.5 MHz while local oscillator 20 continuously produces a signal of 75 MHz. It will be noted that TEO 12 desirably produces a frequency other than the transmitted frequency of 9345 MHz and that the oscillator 20 desirably produces a frequency other than the first or second IF frequency of 82.5 MHz and 7.5 MHz, respectively. There is a reason, which will be described below, for not having the transmitted frequency and first and second IF frequencies generated when antenna 38 is receiving a return signal.

Assuming, then, that modulator 34 produces a relatively positive transmit pulse such as pulse 34a, isolator 14 has its isolation function disabled, permitting the 9262.5 MHz signal to be passed from TEO 12 to mixer 18. Further, transmitter pulse 34a disables the clear signal from divide-by-10 circuit 22, so that mixer 24 mixes 75 MHz from oscillator 20 with 7.5 MHz from divide-by-10 circuit 22 to produce first intermediate frequency value 82.5 MHz. The 82.5 MHz signal is passed by bandpass filter 28 to mixer 18.

Mixer 18 mixes the 9262.5 MHz frequency from TEO 12 with the 82.5 MHz frequency from mixer 24 to produce the desired transmit frequency 9345 MHz, which is passed by filter 30 to amplifier 32. Amplifier 32 is also enabled by pulse 34a. Therefore, antenna 38 transmits a pulse of frequency 9345 MHz of duration determined by the duration of pulse 34a and further determined by the bandwidth of amplifier 32. The pulse transmitted by antenna 38 is typically on the order of 5 to 35 microseconds. At the termination of pulse 34a, isolator 14 is re-energized to attenuate the signal from TEO 12 by on the order of 80 dB. The clear pulse applied to divide-by-10 circuit 22 prevents a signal of 7.5 MHz from being applied to mixer 24. Mixer 24, being a balanced mixer, therefore produces no output signal. Thus, at the termination of pulse 34a, essentially no signals are applied to mixer 18 and therefore no transmitting signal of 9345 MHz is generated.

The signal pulse transmitted by antenna 38 reflects off targets, if any, (not shown) such as precipitation and is reflected back to antenna 38 as an echo signal. The return signal of 9345 MHz is amplified by a sensitive low noise amplifier 42 and mixed with a signal from TEO 12 to produce a first intermediate frequency (IF) of 82.5 MHz. If a system generated transmit frequency or first IF frequency were to be present in the system during the time the return echo signal is expected to be received at antenna 34, the very weak return signal would be swamped by the system generated signals. It is thus essential that the transmit frequency and a signal at the first IF frequency be either not present in the system or at least be attenuated severely. In this case, the better solution, namely the absence of such frequencies, is the situation being utilized.

The first IF signal produced by mixer 16 is amplified by amplifier 44 and mixed with the signal from local oscillator 20 of 75 MHz to produce a second IF frequency of 7.5 MHz which is also not generated in the system during the receive portion of the receive-transmit cycle of modulator 34. The second IF signal is further amplified by amplifier 46 and passed to a suitable utilization circuit which may be a display indicator. A typical weather radar display device is described in U.S. Pat. No. 4,023,165, issued May 10, 1977 to R. A. Holt et al., and assigned to the assignee of the instant invention.

Local oscillator 20, as previously stated, need not be closely controlled as to frequency such as by a crystal controlled oscillator, but rather may be an L-C oscillator. This is true because any variance in frequency which causes the transmitted frequency to vary from a nominal value is compensated for in the receiver by use of the local oscillator frequency in producing the intermediate frequencies by mixers 16 and 26.

It will, of course, be realized that in some applications no second intermediate frequency is needed in which case amplifier 44 may be directly connected to utilization circuit 48.

As stated earlier, the numerous frequencies given in the description of the sole FIGURE are for illustrative purposes only; other frequency combinations may be advantageously utilized without departing from the scope of the invention.

What is claimed is:

1. A radio frequency transmitter-receiver for alternately periodically transmitting pulses of frequency $F_1$ and for receiving return echo signals of frequency $F_1$ comprising, in combination:
   first means continuously generating a signal of frequency $F_2$;
   second means generating a signal of frequency $F_3$ only during the transmission of pulses of frequency $F_1$;
   third means responsive to signals generated by said first means and second means, when present, to generate frequency $F_1$; and
   fourth means responsive to said return signal and first means signal for producing a signal of intermediate frequency $F_3$ at a time that those signals are not generated in the transmitter-receiver, whereby interference by the generated signals is avoided.

2. The combination as set forth in claim 1 wherein said third means comprises a mixer for mixing signals of frequency $F_2$ and $F_3$ to generate frequency $F_1$.

3. The combination as set forth in claim 1 wherein said second means comprises means for continuously generating a signal at frequency $F_4$, means for generating a signal of frequency $F_5$ only during the transmission of said pulses and means for combining said frequency $F_4$ with frequency $F_5$ to produce frequency $F_3$.

4. The combination as set forth in claim 3 wherein said means for combining frequencies $F_4$ and $F_5$ comprises a mixer.

5. The combination as set forth in claim 3 wherein said means for generating a signal of frequency $F_5$ comprises means responsive to said frequency $F_4$ for generating a signal of frequency $F_5$ which is a submultiple of frequency $F_4$.

6. The combination as set forth in claim 5 further including means responsive to said signal of intermediate frequency $F_3$ and to said signal of frequency $F_4$ for producing a signal of second intermediate frequency $F_5$.

* * * * *